(12) United States Patent
Serna et al.

(10) Patent No.: US 12,093,396 B2
(45) Date of Patent: Sep. 17, 2024

(54) SYSTEM AND METHOD FOR ASSOCIATING A COMMON VULNERABILITY AND EXPOSURES (CVE) WITH A COMPUTING DEVICE AND APPLYING A SECURITY PATCH

(71) Applicant: Bank of America Corporation, Charlotte, NC (US)

(72) Inventors: Daniel Joseph Serna, The Colony, TX (US); Christopher Lee Danielson, Poway, CA (US)

(73) Assignee: Bank of America Corporation, Charlotte, NC (US)

( * ) Notice: Subject to any disclaimer, the term of this patent is extended or adjusted under 35 U.S.C. 154(b) by 317 days.

(21) Appl. No.: 16/931,099

(22) Filed: Jul. 16, 2020

(65) Prior Publication Data

US 2022/0019673 A1    Jan. 20, 2022

(51) Int. Cl.
*G06F 21/57*    (2013.01)

(52) U.S. Cl.
CPC ...... *G06F 21/577* (2013.01); *G06F 2221/034* (2013.01)

(58) Field of Classification Search
None
See application file for complete search history.

(56) References Cited

U.S. PATENT DOCUMENTS

| | | |
|---|---|---|
| 6,907,430 B2 | 6/2005 | Chong et al. |
| 7,530,105 B2 | 5/2009 | Gilbert et al. |
| 7,712,137 B2 | 5/2010 | Meier |
| 7,784,099 B2 | 8/2010 | Benjamin |

(Continued)

FOREIGN PATENT DOCUMENTS

| | | | | |
|---|---|---|---|---|
| WO | WO-2020208010 A1 | * | 10/2020 | ........... G06F 21/577 |
| WO | WO-2021144954 A1 | * | 7/2021 | ........... G06F 21/577 |

OTHER PUBLICATIONS

Xiaoxue Wu, Wei Zheng, Xiang Chen, Fang Wang, Dejun Mu, CVE-assisted large-scale security bug report dataset construction method, Journal of Systems and Software, vol. 160, 2020, 110456, ISSN 0164-1212, https://doi.org/10.1016/j.jss.2019.110456.*

(Continued)

*Primary Examiner* — Jeffrey Nickerson
*Assistant Examiner* — Vadim Savenkov

(57) ABSTRACT

A system is configured for associating a CVE with a particular device profile is disclosed. The system receives a request from a user to associate a CVE with a particular device profile. For each device profile from a plurality of device profiles stored in a memory, the system determines feature importance values for features of each device profile. The features of each device profile include at least an operating system and a CPU architecture. The feature importance value of a corresponding feature of a device profile associated with a CVE indicates a probability of the CVE to affect the device profile with respect to that feature. The system identifies a device profile that has features with a total feature importance value above a feature importance threshold value. The system identifies a particular CVE associated with the identified device profile. The system associates the particular CVE with the particular device profile.

17 Claims, 3 Drawing Sheets

(56) References Cited

U.S. PATENT DOCUMENTS

| | | |
|---|---|---|
| 8,141,155 B2 | 3/2012 | Jeschke et al. |
| 8,516,594 B2 | 8/2013 | Bennett et al. |
| 8,613,096 B2 | 12/2013 | Peinado et al. |
| 8,645,714 B2 | 2/2014 | Henry et al. |
| 8,863,293 B2 | 10/2014 | Christodorescu et al. |
| 8,881,288 B1 | 11/2014 | Levy et al. |
| 8,918,883 B1 | 12/2014 | Boyle et al. |
| 8,955,038 B2 | 2/2015 | Nicodemus et al. |
| 9,015,846 B2 | 4/2015 | Watters et al. |
| 9,027,121 B2 | 5/2015 | Hammer et al. |
| 9,060,017 B2 | 6/2015 | Marion et al. |
| 9,256,730 B2 | 2/2016 | Wicherski |
| 9,503,470 B2 | 11/2016 | Gertner et al. |
| 9,680,855 B2 | 6/2017 | Schultz et al. |
| 9,692,778 B1 | 6/2017 | Mohanty |
| 9,807,109 B2 | 10/2017 | Laidlaw et al. |
| 9,886,582 B1 | 2/2018 | Hovor et al. |
| 9,973,524 B2 | 5/2018 | Boyer et al. |
| 9,979,743 B2 | 5/2018 | Hovor et al. |
| 9,998,480 B1 | 6/2018 | Gates et al. |
| 10,015,185 B1* | 7/2018 | Kolman ............ H04L 63/1425 |
| 10,091,229 B2 | 10/2018 | Stute et al. |
| 10,210,470 B2 | 2/2019 | Datta Ray |
| 10,270,799 B2 | 4/2019 | Vasudevan et al. |
| 10,313,389 B2 | 6/2019 | Hovor et al. |
| 10,367,844 B2 | 7/2019 | Stute et al. |
| 10,372,910 B2 | 8/2019 | Martin et al. |
| 10,489,557 B2 | 11/2019 | Chakraborty et al. |
| 10,547,623 B1* | 1/2020 | Han .................... H04L 63/1408 |
| 10,587,640 B2 | 3/2020 | Steelman et al. |
| 11,270,001 B2* | 3/2022 | Shibahara ............ G06F 21/552 |
| 2009/0077666 A1 | 3/2009 | Chen et al. |
| 2013/0282426 A1 | 10/2013 | Watters et al. |
| 2015/0012989 A1 | 1/2015 | Palnitkar et al. |
| 2015/0319054 A1* | 11/2015 | Grigoryev ............ H04L 63/306<br>709/224 |
| 2016/0078365 A1 | 3/2016 | Baumard |
| 2016/0088120 A1* | 3/2016 | Bala .................... G06F 16/9035<br>707/803 |
| 2016/0294861 A1 | 10/2016 | Oliphant et al. |
| 2016/0320435 A1 | 11/2016 | Budhraja et al. |
| 2016/0364860 A1 | 12/2016 | Taylor |
| 2017/0104780 A1 | 4/2017 | Zaffarano et al. |
| 2017/0195176 A1* | 7/2017 | Ke ...................... H04L 41/0886 |
| 2017/0214708 A1 | 7/2017 | Gukal et al. |
| 2017/0324763 A1* | 11/2017 | Vasudevan ......... H04L 63/1433 |
| 2018/0004948 A1* | 1/2018 | Martin ............... H04L 63/1425 |
| 2018/0041537 A1 | 2/2018 | Bloxham et al. |
| 2018/0103054 A1* | 4/2018 | Cran ..................... H04L 63/20 |
| 2018/0225460 A1* | 8/2018 | Nakajima ............ G06F 21/577 |
| 2019/0102564 A1* | 4/2019 | Li ............................ G06N 3/04 |
| 2019/0245894 A1 | 8/2019 | Epple et al. |
| 2019/0347423 A1* | 11/2019 | Sanossian ............. G06F 21/56 |
| 2020/0036741 A1* | 1/2020 | Duchin ............... G06F 9/45558 |
| 2020/0104509 A1* | 4/2020 | Furuichi ............. H04L 63/1433 |
| 2020/0106793 A1 | 4/2020 | Vanamali |
| 2020/0112583 A1* | 4/2020 | Pagano ............... G06F 18/2411 |
| 2020/0137103 A1* | 4/2020 | Ngo ........................ G06F 40/20 |
| 2020/0153855 A1 | 5/2020 | Kirti et al. |
| 2020/0210570 A1* | 7/2020 | Chistyakov ........... G06F 21/562 |
| 2020/0210590 A1* | 7/2020 | Doyle ....................... G06F 8/77 |
| 2020/0213346 A1* | 7/2020 | Shafet ................... G06F 16/953 |
| 2020/0272741 A1* | 8/2020 | Bhatia ................... G06F 40/284 |
| 2020/0372129 A1* | 11/2020 | Gupta ................... G06F 9/3842 |
| 2020/0401702 A1* | 12/2020 | Karabatis .............. G06F 21/577 |
| 2021/0126936 A1* | 4/2021 | Gerber, Jr. .............. H04L 63/20 |
| 2021/0273969 A1* | 9/2021 | Shakarian ............. G06F 40/20 |
| 2021/0367847 A1* | 11/2021 | Vasseur ................... H04L 43/10 |
| 2022/0229912 A1* | 7/2022 | Tavabi ................. H04L 63/1433 |

OTHER PUBLICATIONS

M. U. Aksu et al., "A quantitative CVSS-based cyber security risk assessment methodology for IT systems," 2017 International Carnahan Conference on Security Technology (ICCST), Madrid, Spain, 2017, pp. 1-8, doi: 10.1109/CCST.2017.8167819.*

* cited by examiner

SYSTEM AND METHOD FOR ASSOCIATING A COMMON VULNERABILITY AND EXPOSURES (CVE) WITH A COMPUTING DEVICE AND APPLYING A SECURITY PATCH

TECHNICAL FIELD

The present disclosure relates generally to security vulnerabilities and security exploits technologies, and more specifically to a system and method for associating a Common Vulnerability and Exposures (CVE) with a computing device and applying a security patch.

BACKGROUND

Preventing security vulnerabilities and security exploits in a proactive approach can be difficult using current security vulnerabilities and security exploits management techniques. Current security vulnerabilities and security exploits management techniques utilize an inventory of known device profiles associated with known security vulnerabilities to identify security patching needs. This approach can introduce security gaps as other device profiles with similar features as a device profile present in the inventory may also be vulnerable to those security exploits identified in the known security vulnerabilities associated with the device profile.

SUMMARY

In one embodiment, a system for associating a common vulnerability and exposure (CVE) with a particular device includes a memory to store a plurality of CVEs and a plurality of device profiles. Each device profile is associated with a corresponding CVE. Each device profile comprises features of the device. The features of the device include at least two of an operating system (OS), central processing unit (CPU) architecture, graphics processing unit (GPU) architecture, a memory architecture, and an installed software of the device. The system also includes a processor that is configured to receive a request from a user to associate a CVE with a particular device profile. For each device profile from among the plurality of device profiles stored in the memory, the processor determines feature importance values for features of each device profile. A feature importance value of a corresponding feature of a device profile associated with a CVE indicates a probability of the CVE to affect the device profile with respect to that feature. The processor identifies a device profile from among the plurality of device profiles that has one or more features in common with the particular device profile, where the one or more features are associated with a total feature importance value above a feature importance threshold value. The total feature importance value of the device profile is a sum of feature importance values of the one or more features of the device profile in common with the particular device profile. The processor identifies a particular CVE associated with the identified device profile. The processor associates the particular CVE with the particular device profile.

The existing security and vulnerability management technologies utilize an inventory of known device profiles associated with known CVEs to identify security patching needs of the known device profiles within an organization. The existing security and vulnerability management technologies lack capabilities to determine whether the known CVEs associated with the known device profiles (available in the inventory) also affect other device profiles (not yet included in the inventory) with one or more features with a total feature importance values higher than a feature importance threshold value of features in common with any of the known device profiles. A feature importance value of a feature in a device profile indicates a probability of the CVE (associated with the device profile) to affect the device profile with respect to that feature. For example, assume that a first device profile associated with a CVE-1 already exists in the inventory of known device profiles. Also assume that a second device profile has one or more features, such as an OS, CPU architecture, GPU architecture, memory architecture, installed software, etc. in common with the first device profile (i.e., the second device profile is similar to the first device profile). Also, assume that the total feature importance of the one or more features is above the feature importance threshold value. The existing security and vulnerability management technologies are not configured to associate the CVE-1 with the second device profile or provide a security patch to the second device profile for addressing the security vulnerabilities identified in the CVE-1.

The existing security and vulnerability management technologies use a community-based approach to determine and associate CVEs with device profiles. In the community-based approach, a particular device profile is associated with a particular CVE when a user from the community experiences that the particular device (associated with the particular device profile) is affected by the particular CVE. In other words, the existing security and vulnerability management technologies use a reactive approach in associating CVEs with device profiles. Thereby, the inventory of device profiles is updated after the particular device is affected by the particular CVE; and the particular device profile associated with the particular CVE is added to the inventory of device profiles. This approach does not account for other device profiles which have one or more features with a total feature importance values higher than a feature importance threshold value in common with the device profiles already present in the inventory of known device profiles which may be vulnerable to the same CVEs that affects the known device profiles. This leads to a security gap in which the other device profiles (which are not yet included in the inventory of the known device profiles) remain vulnerable to the same CVE that affects the known device.

Certain embodiments of this disclosure provide unique solutions to technical problems of previous security and vulnerability management technologies, including those problems described above. For example, the disclosed system provides several technical advantages, which include: 1) associating CVEs to other device profiles (not included in the inventory of known device profiles) which have one or more features with a total feature importance values higher than a feature importance threshold value (e.g., 80%) in common with known device profiles already present in the inventory. A feature importance value of each feature in a particular device profile associated with a particular CVE (already present in the inventory) is determined based at least in part upon a probability that a particular CVE to affect the particular device profile with respect to that feature. (i.e., providing CVEs for the device which have similar device profiles as the known device); and 2) providing security patches to the other device profiles to address security vulnerabilities and security exploits which are identified in the known CVEs associated with the other device profiles. As such, this disclosure may improve the underlying operation of other devices (associated with the other device profiles not included in the inventory). Accordingly, the disclosed system may provide a practical application of associating security vulnerabilities and security exploits with the other devices before they affect the other devices. This, in turn, provides an additional practical application of providing a solution to reduce a risk of exposure to emerging security vulnerabilities and security exploits, such as emerging malware, cyberattacks, etc. for the other devices by recommending a security patch associated with the known CVEs.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
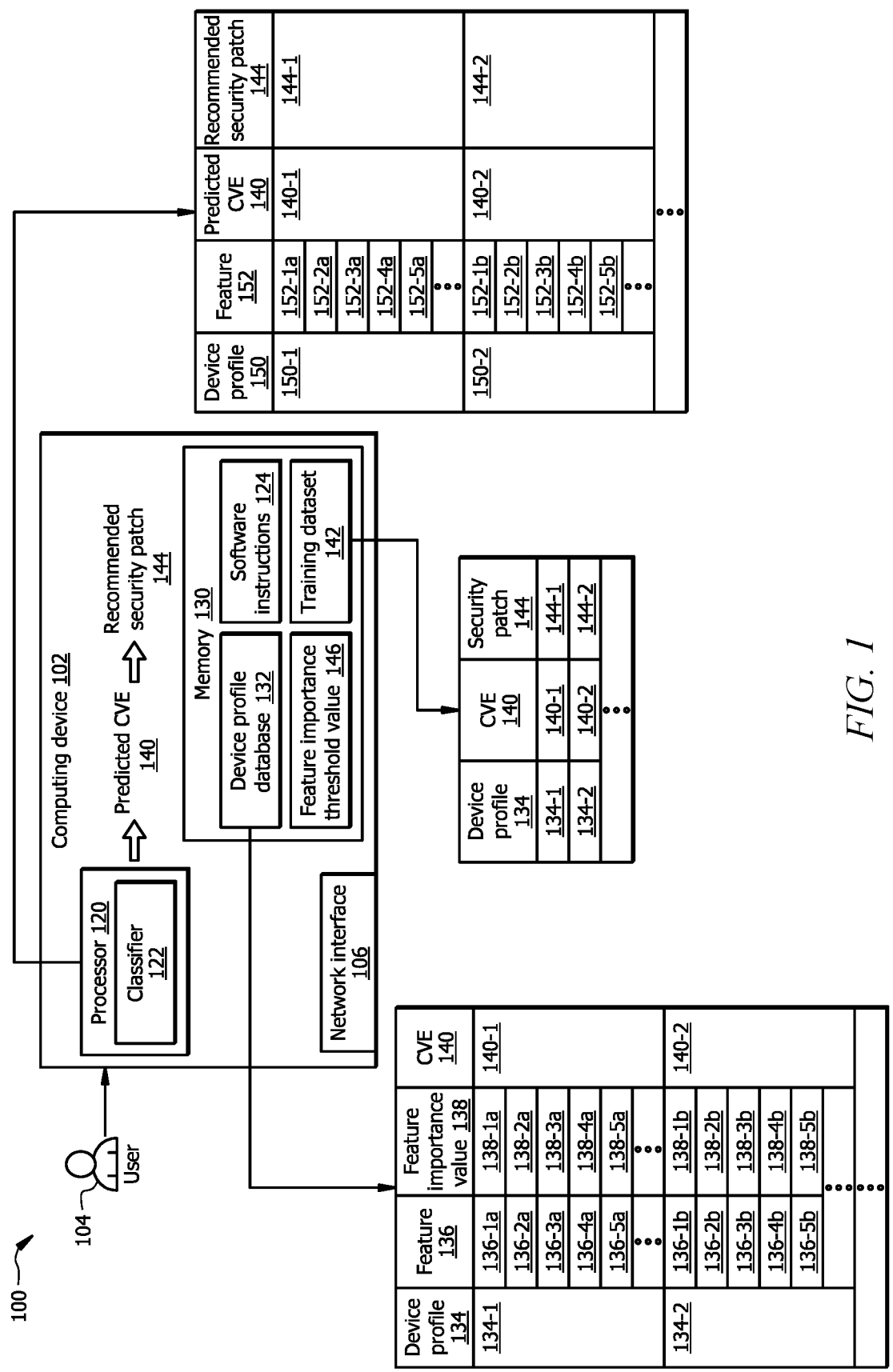
FIG. 1 illustrates one embodiment of a system configured to determine a CVE for a particular device.

FIG. 1 illustrates one embodiment of a system 100 configured to associate a CVE 140 with a particular device profile 150. In one embodiment, the system 100 comprises a computing device 102 that includes processor 120 in signal communication with a memory 130 and a network interface 106. Memory 130 includes software instructions 124 that when executed by the processor 120 cause the computing device 102 to perform one or more functions described herein. Memory 130 may also include a device profile database 132 and a training dataset 142 which provides information that may be used by software instructions 124 and/or processor 120. In one embodiment, the processor 120 includes a classifier 122. In other embodiments, system 100 may not have all of the components listed and/or may have other elements instead of, or in addition to, those listed above.

In general, the system 100 improves the security and vulnerability management technologies by associating the CVEs 140 with device profiles 150 which are not included in the device profile database 132. For example, the system 100 predicts that a CVE 140-1 affects a device profile 150-1 by identifying a device profile 134-1 (associated with the CVE 140-1) which has one or more features 136 in common with the device profile 150-1, where a total feature importance value 138 associated with the common one or more features 136 is above the feature importance threshold value 146. The feature importance value 138 associated with a feature 136 in a device profile 134 (associated with a CVE 140) indicates a probability that the CVE 140 to affect the device profile 134 with respect to that feature 136. System 100 also provides a solution for reducing the risk of CVE 140-1 affecting the device profile 150-1 by recommending a security patch 144-1 to update the device profile 150-1.

Computing device 102 is generally any computing device configured to communicate with other computing devices, servers, etc. through the network interface 106. The computing device 102 is configured to perform specific functions described herein and interact with users 104, e.g., via user interfaces. Examples of the computing device 102 include but are not limited to desktop computers, mobile phones, tablet computers, laptop computers, servers, etc.

Within an organization, there may be a large number of computing devices (e.g., computing device 102) associated with device profiles 134, where a device profile 134 associated with each computing device includes features 136, such as, for example, an Operating System (OS), Central Processing Unit (CPU) architecture, Graphics Processing Unit (GPU) architecture, memory architecture, installed software, etc. The device profile database 132 within the organization is an inventory of the computing devices with device profiles 134 associated with CVEs 140. The CVEs 140 include security vulnerabilities and exploits that affect the computing devices associated with the device profiles 134. For example, a CVE 140 may indicate that a particular driver in an update of Windows 7 OS includes a defect that allows a third party to gain the privilege of accessing the OS files. In one embodiment, the CVEs 140 are recorded in the National Vulnerability Database (NVD) and available to the public. Typically, a particular CVE 140-1 is associated with the device profile 134-1 as an employee of the organization operating the computing device (associated with the device profile 134-1) experiences that the particular CVE 140-1 has affected the computing device. The employee of the organization may then report the particular CVE 140-1 affecting the computing device to an appropriate department to update the device profile database 132 to include the device profile 134-1 associated with the particular CVE 140-1.

Network interface 106 is configured to enable wired and/or wireless communications. The network interface 106 is configured to communicate data between the computing device 102 and other devices, systems, or domain(s). For example, the network interface 106 may comprise a WIFI interface, a local area network (LAN) interface, a wide area network (WAN) interface, a modem, a switch, or a router. The processor 120 is configured to send and receive data using the network interface 106. The network interface 106 may be configured to use any suitable type of communication protocol as would be appreciated by one of ordinary skill in the art.

Processor 120 comprises one or more processors operably coupled to network interface 106, and memory 130. The processor 120 is any electronic circuitry including, but not limited to, state machines, one or more central processing unit (CPU) chips, logic units, cores (e.g. a multi-core processor), field-programmable gate array (FPGAs), application-specific integrated circuits (ASICs), or digital signal processors (DSPs). The processor 120 may be a programmable logic device, a microcontroller, a microprocessor, or any suitable combination of the preceding. The one or more processors are configured to process data and may be implemented in hardware or software. For example, the processor 120 may be 8-bit, 16-bit, 32-bit, 64-bit, or of any other suitable architecture. The processor 120 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 124) to implement classifier 122. In this way, processor 120 may be a special-purpose computer designed to implement the functions disclosed herein. In an embodiment, the processor 120 is implemented using logic units, FPGAs, ASICs, DSPs, or any other suitable hardware. The processor 120 is configured to operate as described in FIGS. 1-3. For example, the processor 120 may be configured to perform the steps of method 300 as described in FIG. 3.

Memory 130 may be volatile or non-volatile and may comprise a read-only memory (ROM), random-access memory (RAM), ternary content-addressable memory (TCAM), dynamic random-access memory (DRAM), and static random-access memory (SRAM). Memory 130 may be implemented using one or more disks, tape drives, solid-state drives, and/or the like. Memory 130 is operable to store the software instruction 124, device profile database 132, training dataset 142, and/or any other data or instructions. The software instruction 124, device profile database 132, and training dataset 142 may comprise any suitable set of instructions, logic, rules, or code operable to execute the processor 120. The stored software instruction 124, device profile database 132, and training dataset 142 are described in more detail below.

Classifier

Classifier 122 may be implemented using software instructions 124 executed by the processor 120, and is configured to associate a CVE 140 with a device profile 150 that is not present in the device profile database 132. In one embodiment, the classifier 122 may be implemented using machine learning classification algorithms, such as, for example, Support Vector Machine (SVM), Naive Bayes, Logistic Regression, k-Nearest Neighbors, Decision trees, etc. In other embodiment, classifier 122 may utilize a plurality of neural network (NN) layers, Convolutional NN layers (CNN) layers, and/or the like, in which weights and biases of perceptrons of the NN and CNN layers are optimized in the training process of the classifier 122.

In one embodiment, the classifier 122 may associate a particular CVE 140 with a particular device profile 150 by identifying a device profile 134 (associated with the particular CVE 140) which includes one or more features 136 with a total feature importance value 138 above the feature importance threshold value 146. Throughout this process, the classifier 122 first determines feature importance values 138 associated with features 136 in each device profile 134. The feature importance value 138 associated with a feature 136 in a device profile 134 (associated with a CVE 140) is a numerical representation of a probability or likelihood of the CVE 140 to affect the device profile 134 with respect to that feature 136.

In one embodiment, within an organization, the feature importance values 138 associated with features 136 in each device profile 134 may be determined by data gathered from employees of the organization, for example, via Jira tickets, etc. For example, when an employee of the organization operating a computing device (associated with a device profile 134), the employee may experience that a security vulnerability identified in a CVE 140 is affecting the computing device and report in a Jira ticket that the computing device is affected by the CVE 140. The reported Jira ticket may also indicate the severity and frequency of the CVE 140 affecting the computing device with respect to different features 136. Thus, the feature importance values 138 associated with features 136 in each device profile 134 within the organization may be determined based on the severity and frequency of the CVE 140 affecting the computing devices with respect to different features 136 indicated in a plurality of Jira tickets from employees of the organization.

In another embodiment, the classifier 122 may determine the feature importance values 138 associated with features 136 in each device profile 134, e.g., using a Natural Language Processing (NLP) algorithm by paring through a documentation of the CVE 140 (associated with each device profile 134) which is available on the webpage of the CVE 140. The NLP algorithm may be implemented using software instructions 124 executed by the processor 120, and is configured to determine a meaning and sentiment of documentations of CVEs 140. The NLP algorithm may implement a plurality of NN layers, CNN layers, etc., in which weights and biases of perceptrons of the NN and CNN layers are adjusted to determine the meaning and the sentiment of the documentations of the CVEs 140 more accurately.

The classifier 122 may also extract incidents caused by security vulnerabilities identified in the documentation of the CVEs 140 which are reported by different users 104 (available on the webpage of the CVE 140). The classifier 122 may extract the reported incidents by web scraping and determine the severity and frequency of the CVE 140 affecting a computing device with a device profile 134 with respect to each feature 136. For example, the classifier 122 may extract specific keywords identified in the reported incidents (available in the reference links provided in the webpage of the CVE 140) and determine the severity and frequency of the CVE 140 affecting the computing device with the device profile 134 with respect to each feature 136.

For example, assume that security vulnerabilities of a CVE 140 are identified in a description of the CVE 140, such as, "ActiveX Control(HShell.dll) in Handy Groupware 1.7.3.1 for Windows 7 allows an attacker to execute arbitrary command via the ShellExec method." Thus, the classifier 122 (e.g., using the NLP algorithm) may determine the meaning and sentiment of this description and determine that this particular CVE 140 is related to Windows 7 OS feature 136 and this particular CVE 140 affects device profiles 134 which include Windows 7 OS feature 136.

The classifier 122 may also extract the number of times this CVE 140 affects device profiles 134 with Windows 7 OS feature 136 reported by different users, e.g., using web scraping the reference links provided in the webpage of the CVE 140. If the number of times this CVE 140 affected the device profiles 134 with Windows 7 OS feature 136 is high, the classifier 122 may determine that the severity of the CVE 140 is also high. The classifier 122 may also determine the severity of the CVE 140 affecting device profiles 134 with Windows 7 OS feature 136 based on a risk of the CVE 140 imposes on the device profiles 134 with Windows 7 OS feature 136. For example, as a consequence of this CVE 140, if a third party would be able to access confidential data, the classifier 122 may determine that the severity of the CVE 140 is high. In another example, as a consequence of this CVE 140, if a third party would be able to erase the memory of the device profile 134 with Windows 7 OS feature 136, the classifier 122 may determine that the severity of the CVE 140 is high.

Thus, based on the determined meaning of the description of the CVE 140, the extracted reported incidents, and frequency and severity of the CVE 140, the classifier 122 may determine and assign feature importance values 138 for each feature 136 in device profiles 134. Some examples of the classifier 122 determining feature importance values 138 for features 136 in device profiles 134 are described in conjunction with the method 300 illustrated in FIG. 3. Once the feature importance values 138 associated with features 136 in each device profile 134 are determined, the classifier 122 is trained, tested, and refined with the training dataset 142 (which includes the device profiles 134 labeled with CVEs 140). In implementation, the classifier 122 may be given one or more of the device profiles 150 (which are not labeled with CVEs 140) and asked to associate one or more CVEs 140 to them. Details of training, testing, and refining the classifier 122 are described in FIG. 2.

Figure 2:
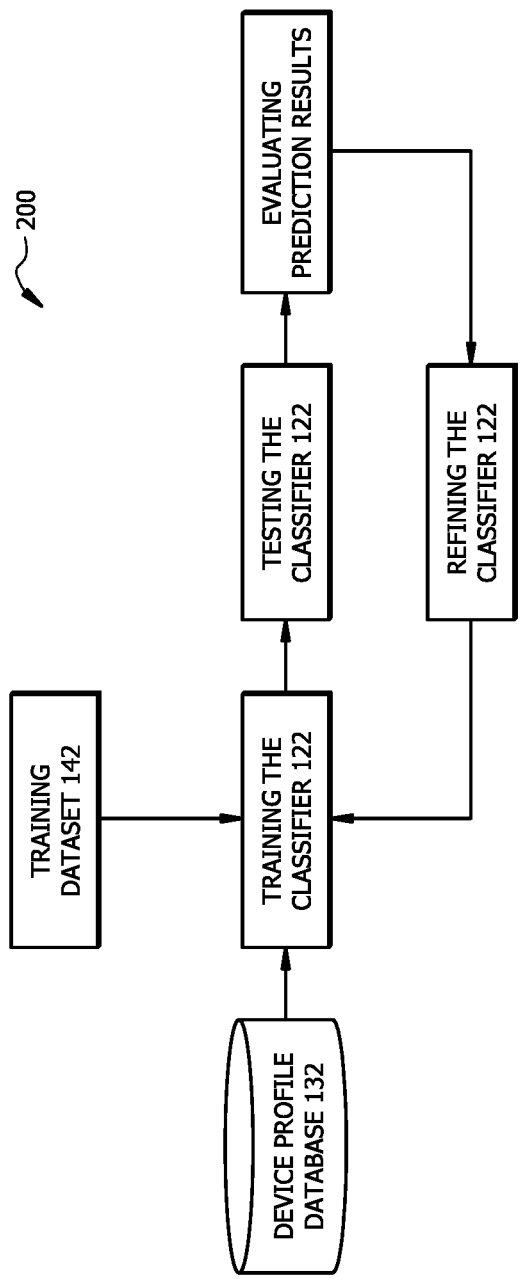
FIG. 2 illustrates one embodiment of an operational flow of generating a classifier.

FIG. 2 illustrates one example of a modeling of the classifier 122. In one embodiment, the classifier 122 is generated or modeled using the device profiles databases 132 and training dataset 142. The training dataset 142 includes the device profiles 134 associated or classified with CVEs 140 and security patches 144. In the training dataset 142, each device profile 134 is labeled with its corresponding CVE 140. As such, the target variables in training the classifier 122 are the CVEs 140. In the training process, the classifier 122 is given a first portion of device profiles 134 labeled with CVEs 140 (from a first portion of the training dataset 142) to learn the association between the device profiles 134 and their corresponding CVEs 140.

Once the classifier 122 is trained, it is tested using a second portion of device profiles 134 without their corresponding CVEs 140 (from a second portion of the training dataset 142) which the classifier 122 has not yet been exposed thereto. In this process, the classifier 122 is given the second portion of the device profiles 134 and is asked to predict or associate CVEs 140 with them. The classifier 122 predicts or associates CVEs 140 with the second portion of the device profiles 134 based on the learned data from the training process. The prediction results from the testing process is then evaluated. In this process, the classifier 122 compares the predicted CVEs 140 with the actual CVEs 140 associated with the second portion of the device profiles 134. If one or more of the second portion of the device profiles 134 are not associated with a correct CVE 140, the classifier 122 is refined, e.g., by performing a backpropagation process in which one or more weight and bias values in the neural network layers of the classifier 122 are adjusted. In one embodiment, the classifier 122 may be refined by using a third portion of the device profiles 134 which the classifier 122 has not yet been exposed thereto. The classifier 122 may go through the training, testing, and refining process until the prediction results of CVEs 140 associated with the device profiles 150 are above, e.g., 99%.

Once the classifier 122 is finalized, it is implemented to associate the CVEs 140 with the device profiles 150 (which are not included in the device profile database 132 or the training dataset 142). In the implementation process, the user 104 may request the classifier 122 to associate a CVE 140 with a device profile 150. The classifier 122 identifies a particular device profile 134 which has one or more features 136 in common with the device profile 150, and a total feature importance values 138 associated with the one or more common features 136 is above the feature importance threshold value 146, e.g., 80%. The classifier 122 identifies the particular CVE 140 associated with the particular device profile 134. The classifier 122 then associates the particular CVE 140 with the device profile 150. Details of the operation of the classifier 122 are described in conjunction with the method 300 illustrated in FIG. 3.

In one embodiment, the classifier 122 may associate one or more of known CVEs 140 with the particular device profile 150. For example, the classifier 122 may identify that the first device profile 134-1 associated with the CVE 140-1 has one or more features 136 with a total feature importance value 138 higher than the feature importance threshold value 146. Thus, the classifier 122 may associate the particular device profile 150 with the CVE 140-1. In the same example, the classifier 122 may also identify that the second device profile 134-2 associated with the CVE 140-2 has one or more features 136 with a total feature importance value 138 higher than the feature importance threshold value 146. Thus, the classifier 122 may also associate the CVE 140-2 with the particular device profile 150. The classifier 122 may duplicate the particular device profile 150 for each of these two CVEs 140-1 and 140-2 and associate the CVE 140-1 with a first copy of the particular device profile 150; and associate the CVE 140-2 with a second copy of the particular device profile 150.

Example of a Method for Associating a CVE with a Device Profile

Figure 3:
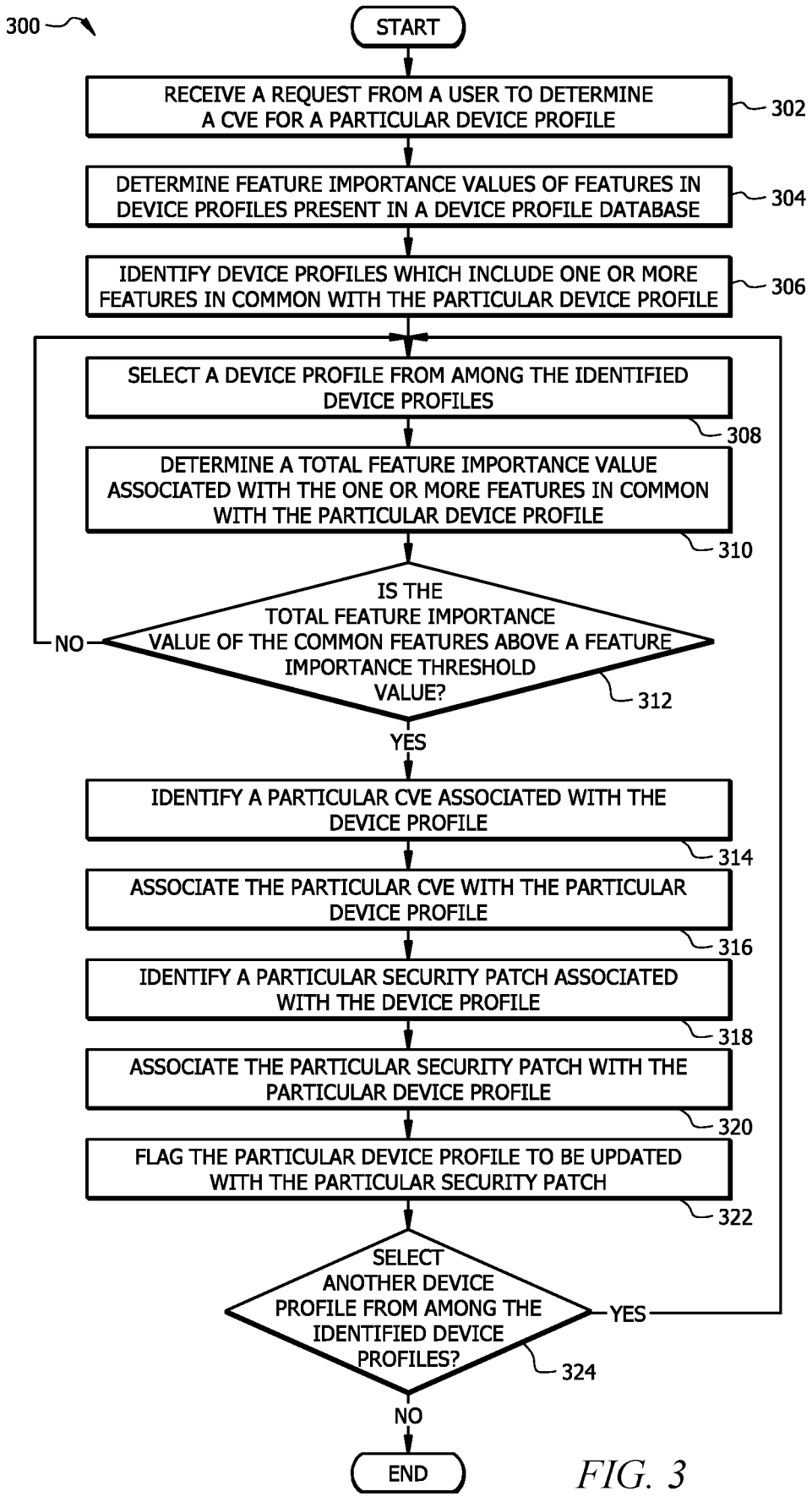
FIG. 3; illustrates an example flow chart of a method for associating a CVE with a particular device.

FIG. 3 illustrates a flow chart of a method 300 for associating a CVE 140 with a device profile 150. One or more of steps 302-324 of the method 300 may be implemented, at least in part, in the form of software instructions 124 stored on non-transitory, tangible, machine-readable media (e.g., memory 130) that when run by one or more processors (e.g., processor 120) may cause the one or more processors to perform steps 302-324. In some embodiments, method 300 may be performed on system 100 of FIG. 1, including the computing device 102, processor 120, and the classifier 122. Aspects of the steps 302-324 of the method 300 have been covered in the description for FIGS. 1-2; and additional aspects are provided below.

The method 300 begins at step 302 where the user 104 sends a request to the classifier 122 to determine a CVE 140 for a particular device profile 150 (which is not included in the device profile database 132). For example, the user 104 may send the request to the classifier 122 by a user interface of the computing device 102, coding console application of the classifier 122, etc.

In step 304, the classifier 122 determines feature importance values 138 associated with the features 136 of device profiles 134 in the device profile database 132, for example, as described in FIG. 1.

In a first example, consider a device profile 134-1 (associated with a first computing device, e.g., a desktop computer, a server, a laptop, etc.) which includes features 136, such as, Windows 7 SP1 OS feature 136-1a, X64 CPU architecture feature 136-2a, Compute Unified Device Architecture (CUDA) GPU architecture feature 136-3a, Double Data Rate 3 (DDR3) memory architecture feature 136-4a, and Python 2.7 feature 136-5a, as illustrated in TABLE. 1.

TABLE 1

Example of the first device profile 134-1.

| Device profile 134 | Features 136 | | CVE 140 |
|---|---|---|---|
| Device profile 134-1 | OS Feature 136-1a | Windows 7 SP1 | CVE 140-1 |
| | CPU architecture Feature 136-2a | X64 | |
| | GPU architecture Feature 136-3a | CUDA | |

TABLE 1-continued

Example of the first device profile 134-1.

| Device profile 134 | Features 136 | | CVE 140 |
|---|---|---|---|
| | Memory architecture Feature 136-4a | DDR3 | |
| | Installed software Feature 136-5a | Python 2.7 | |

As illustrated in TABLE 1, the device profile 134-1 is associated with the CVE 140-1. The device profile 134-1 may also be associated with other CVEs 140 which are recorded in separate device profiles 134 associated with the first computing device. In this example, assume that the documentation of the CVE 140-1 includes a text description, such as, for example, "a security vulnerability may occur when a user attempts to send an HTTP server request using an installed Python Idle software with version 2.7 from a urllib.request.AbstractBasicAuthHandler package."

The classifier 122 determines the feature importance values 138-1a to 138-5a associated with the features 136-1a to 136-5a, respectively, based on the probability or likelihood of the CVE 140-1 to affect the first computing device with respect to each feature 136-1a to 136-5a. The probability of the CVE 140-1 to affect the first computing device with respect to each feature 136-1a to 136-5a is determined based on the determined meaning of the description of the CVE 140, the extracted reported incidents, and frequency and severity of the CVE 140-1, as described in FIG. 1. In one embodiment, the classifier 122 uses the NLP algorithm to determine the probabilities of CVE 140-1 affecting the first computing device with respect to each feature 136-1a to 136-5a, e.g., by paring through the documentation of CVE 140-1. In this process, the classifier 122 may use the NLP algorithm to extract the meaning of the documentation of the CVE 140-1 and determine that the CVE 140-1 affects the first computing device with respect to the installed Python software 2.7 feature 136-5a. The classifier 122 may also extract reported incidents (available on the webpage of the CVE 140-1) by web scraping and determine a severity and frequency of the CVE 140-1 affecting the first computing device with respect to the installed Python software 2.7 feature 136-5a, as described in FIG. 1. Thus, based on the determined meaning of the description of the CVE 140-1 and the extracted reported incidents, the classifier 122 may determine that the probability of the CVE 140-1 to affect the first computing device with respect to the installed Python software 2.7 feature 136-5a is high. The classifier 122 may also determine that CVE 140-1 documentation does not include a security vulnerability related to any other features 136 of device profile 134-1 (i.e., determines that the probability of CVE 140-1 to affect the first computing device with respect to other features 136 is 0%). Thus, the classifier 122 may determine that the probability of the CVE 140-1 to affect the first computing device with respect to the installed Python software 2.7 feature 136-5a is 100%. As such, the classifier 122 assigns a high feature importance value 138-5a (i.e., 100%) to the installed Python software 2.7 feature 136-5a. The classifier 122 may assign a low feature importance value 138 (i.e., 0%) to other features 136 of the device profile 134-1, as illustrated in TABLE. 2.

TABLE 2

Example of the first device profile 134-1 with feature importance values 138.

| Device profile 134 | Feature 136 | | Feature importance value 138 | CVE 140 |
|---|---|---|---|---|
| Device profile 134-1 | OS Feature 136-1a | Windows 7 SP1 | 0% 138-1a | CVE 140-1 |
| | CPU architecture Feature 136-2a | X64 | 0% 138-2a | |
| | GPU architecture Feature 136-3a | CUDA | 0% 138-3a | |
| | Memory architecture Feature 136-4a | DDR3 | 0% 138-4a | |
| | Installed software Feature 136-5a | Python 2.7 | 100% 138-5a | |

In a second example, consider a second device profile 134-2 (associated with a second computing device, e.g., a desktop computer, a server, a laptop, etc.) which includes features 136, such as, Windows 7 SP1 OS feature 136-1b, X64 CPU architecture feature 136-2b, Open Computing Language (OpenCL) GPU architecture feature 136-3b, DDR2 memory architecture feature 136-4b, and Python 2.7 feature 136-5a, as illustrated in TABLE. 3.

TABLE 3

Example of the second device profile 134-2.

| Device profile 134 | Features 136 | | CVE 140 |
|---|---|---|---|
| Device profile 134-2 | OS Feature 136-1b | Windows 7 SP1 | CVE 140-2 |
| | CPU architecture Feature 136-2b | X64 | |
| | GPU architecture Feature 136-3b | OpenCL | |

TABLE 3-continued

Example of the second device profile 134-2.

| Device profile 134 | Features 136 | | CVE 140 |
|---|---|---|---|
| | Memory architecture Feature 136-4b | DDR2 | |
| | Installed software Feature 136-5b | Python 2.7 | |

As illustrated in TABLE 3, the device profile 134-2 is associated with a CVE 140-2. In this example, assume that the documentation of the CVE 140-2 includes a text description, such as, for example, "In Python 2.7, an insecure dependency load upon launch on Windows 7 may result in an attacker's copy of api-ms-win-core-path-11-1-0.dll being loaded and used instead of the system's copy." The classifier 122 determines the feature importance values 138-1b to 138-5b associated with the features 136-1b to 136-5b, respectively, based on the probability or likelihood of the CVE 140-2 to affect the second computing device with respect to each feature 136-1b to 136-5b. The classifier 122 may use the NLP algorithm to extract the meaning of the documentation of the CVE 140-2 and determine that the CVE 140-2 affects the second computing device with respect to the Windows 7 OS feature 136-1a and installed Python software 2.7 feature 136-5b. The classifier 122 may also extract reported incidents (available on the webpage of the CVE 140-2) by web scraping and determine a severity and frequency of the CVE 140-2 affecting the second computing device with respect to the Windows 7 OS feature 136-1b and installed Python software 2.7 feature 136-5b. For example, assume that 70 out of 100 users 104 who reported the CVE 140-2 affected their computing device (which includes the Windows 7 OS feature 136-1b and installed Python software 2.7 feature 136-5b) also reported that the CVE 140-2 poses a greater risk with respect to the Windows 7 OS feature 136-1b, such as, for example, these users 104 were unable to recover the api-ms-win-core-path-11-1-0.dll file in their Windows 7 OS. Also, assume that 30 out of 100 of users 104 who reported the CVE 140-2 affected their computing device (which includes the Windows 7 OS feature 136-1b and installed Python software 2.7 feature 136-5b) also reported that they were able to recover the above-mentioned file by removing the Python 2.7 from their computing device. Thus, based on the determined meaning of the CVE 140-2 and the extracted reported incidents, the classifier 122 may determine that the probability of the CVE 140-2 to affect the second computing device with respect to the Windows 7 OS feature 136-1b is, e.g., 70%; and the probability of CVE 140-2 to affect the second computing device with respect to the installed Python software 2.7 feature 136-5b is, e.g., 30%.

The classifier 122 may also determine that the documentation of the CVE 140-2 does not include a security vulnerability related to any other features 136 of device profile 134-2. Thus, the classifier 122 may determine that the probability of CVE 140-2 to affect the second computing device with respect to other features is 0%. As such, the classifier 122 assigns a low probability or low feature importance value 138 (i.e., 0%) to other features 136 of the device profile 134-2, as illustrated in TABLE. 4.

TABLE 4

Example of the second device profile 134-2 with feature importance values 138.

| Device profile 134 | Feature 136 | | Feature importance value 138 | CVE 140 |
|---|---|---|---|---|
| Device profile 134-2 | OS Feature 136-1b | Windows 7 SP1 | 70% 138-1b | CVE 140-2 |
| | CPU architecture Feature 136-2b | X64 | 0% 138-2b | |
| | GPU architecture Feature 136-3b | OpenCL | 0% 138-3b | |
| | Memory architecture Feature 136-4b | DDR2 | 0% 138-4b | |
| | Installed software Feature 136-5b | Python 2.7 | 30% 138-5b | |

In step 306, the classifier 122 identifies the device profiles 134 which include one or more features in common with the particular device profile 150. In this process, the classifier 122 determines the features 152 associated with the particular device profile 150 and compares each of those features 152 with the features 136 associated with each device profile 134. For example, assume that the classifier 122 is comparing the particular device profile 150-1 with the device profile 134-1. The classifier 122 determines that the particular device profile 150-1 includes the features 152-1a to 152-5a; and the device profile 134-1 includes the features 136-1a to 136-5a. Then, the classifier 122 determines the features 152 in the particular device profile 150-1 which are in common with features 136 in the device profile 134-1. In some examples, the classifier 122 may identify a plurality of device profiles 134 which have one or more features 136 in common with the particular device profile 150-1.

For example, assume that the particular device profile 150-1 (associated with a computing device, e.g., a desktop computer, a server, a laptop, etc.) includes the features 152, such as, Windows 8 OS feature 152-1a, X86 CPU architecture feature 152-2a, OpenCL GPU architecture feature 152-3a, DDR4 memory architecture feature 152-4a, and Python 2.7 feature 152-5a, as illustrated in TABLE. 5.

TABLE 5

Example of the device profile 150-1.

| Device profile 150 | Features 152 | |
|---|---|---|
| Device profile 150-1 | OS Feature 152-1a | Windows 8 |
| | CPU architecture Feature 152-2a | X86 |
| | GPU architecture Feature 152-3a | OpenCL |
| | Memory architecture Feature 152-4a | DDR4 |
| | Installed software Feature 152-5a | Python 2.7 |

In this example, the classifier 122 compares the features 136 of the device profiles 134-1 and 134-2 illustrated in TABLES 2 and 4, respectively. In comparing the device profile 150-1 with the device profile 134-1, the classifier 122 determines that the device profile 134-1 has the installed software Python 2.7 feature 136-5a in common with the device profile 150-1. In comparing the device profile 150-1 with the device profile 134-2, the classifier 122 determines that the device profile 134-2 has the OpenCL GPU architecture feature 136-3b and the installed software Python 2.7 feature 136-5b in common with the device profile 150-1.

In step 308, the classifier 122 selects a device profile 134 from among the plurality of device profiles 134 for evaluation. The classifier 122 iteratively selects a device profile 134 from among the plurality of device profiles 134 for evaluation.

In step 310, the classifier 122 determines a total feature importance value 138 associated with the features 136 which are in common between the device profile 134 and the particular device profile 150.

In a first example, assume that the classifier 122 is determining the total feature importance value 138 associated with features 136 in device profile 134-1 (illustrated in TABLE. 2.) in common with the device profile 150-1 (illustrated in TABLE. 5.). In this example, the classifier 122 identifies that the device profile 134-1 has the feature 136-5a in common with the device profile 150-1, where both the device profile 134-1 and the device profile 150-1 include Python 2.7 installed software feature 135-5a. Thus, the classifier 122 identifies that the feature importance value 138-5a associated with the feature 135-5a is 100%. In this particular example, since CVE 140-1 affects the first device profile 134-1 with the installed software Python 2.7, it may also affect the device profile 150-1.

In a second example, assume that the classifier 122 is determining the total feature importance value 138 associated with features 136 in device profile 134-2 (illustrated in TABLE. 4.) in common with the device profile 150-1 (illustrated in TABLE. 5.). In this example, the classifier 122 determines that the device profile 134-2 has the features 136-3b and 136-5b in common with the device profile 150-1. The classifier 122 sums up the feature importance values 138-3b and 138-5b and determines that the total feature importance value 138 is 30%. In this particular example, since the CVE 140-2 affects computing devices with device profiles 150 which include the Windows 7 OS feature 136-1b and the Python 2.7 installed software feature 136-5b, the classifier 122 determines that computing devices with device profiles 150 which do not include either of these features may not be affected by the CVE 140-2.

In step 312, the classifier 122 determines whether the total feature importance value 138 associated with the features 136 of device profile 134 which are in common with the particular device profile 150 is above the feature importance threshold value 146, e.g. 80%. If the classifier 122 determines that the total feature importance value 138 associated with the common features 136 is below the feature importance threshold value 146, the method 300 returns to the step 308 where another device profile 134 which includes one or more features 136 in common with the particular device profile 150 is selected for evaluation. If, however, the classifier 122 determines that the total feature importance value 138 associated with the common features 136 is above the feature importance threshold value 146, the method 300 proceeds to step 314.

Continuing the first example in step 310, the classifier 122 determined that the device profile 134-1 has the Python 2.7 installed software feature 136-5a in common with the device profile 150-1. The classifier 122 also determined that the feature importance values 138-5a associated with the common feature 136-5a is 100% which is above the feature importance threshold value 146 (i.e., 80%). In other words, the classifier 122 determines that a similarity between the device profile 134-1 and the device profile 150-1 is above a similarity threshold or the feature importance threshold value (i.e., 80%).

Continuing the second example in step 310, the classifier 122 determined that the device profile 134-2 has the features 136-3b and 136-5b in common with the device profile 150-1. The classifier 122 sums up the feature importance values 138-3b and 138-5b and determines that the total feature importance value 138 is 30% which is below the feature importance threshold value 146 (i.e., 80%). Thus, even though the device profile 134-2 has the features 136-3b and 136-5b in common with the device profile 150, the classifier 122 determines that a similarity between the device profile 134-2 and the device profile 150-1 is below the similarity threshold or the feature importance threshold value (i.e., 80%).

In step 314, classifier 122 identifies the particular CVE 140 which is associated with the selected device profile 134. In one example, the classifier 122 identifies the particular CVE 140 based on its corresponding unique CVE ID, such as CVE 2020-4332, etc.

In step 316, the classifier 122 associates or classifies a particular device profile 150 with the particular CVE 140.

Continuing the first example in step 310, since the total feature importance value 138 associated with the common feature 136-5a is above the feature importance threshold value 146, the classifier 122 predicts that the device profile 150-1 may also be affected by the CVE 140-1 (which is associated with the first device profile 134-1). In other words, the classifier 122 predicts that the security vulnerability identified in the CVE 140-1 may also affect the device profile 150-1. As such, the classifier 122 associates the device profile 150-1 with the CVE 140-1, e.g., by adding the CVE 140-1 column to the device profile 150-1, as illustrated in TABLE. 6.

TABLE 6

Example of the device profile 150-1 with the predicted CVE 140-1.

| Device profile 150 | Features 152 | | Predicted CVE 140 |
|---|---|---|---|
| Device profile 150-1 | OS Feature 152-1a | Windows 8 | CVE 140-1 |
| | CPU architecture Feature 152-2a | X86 | |
| | GPU architecture Feature 152-3a | OpenCL | |

TABLE 6-continued

Example of the device profile 150-1 with the predicted CVE 140-1.

| Device profile 150 | Features 152 | Predicted CVE 140 |
|---|---|---|
| | Memory architecture Feature 152-4a | DDR4 |
| | Installed software Feature 152-5a | Python 2.7 |

As such, the classifier 122 may associate any device profile 150 which includes the Python 2.7 feature 152 with the CVE 140-1.

Continuing the second example in step 310, since the total feature importance value 138 associated with the common feature features 136-3b and 136-5b is below the feature importance threshold value 146, the classifier 122 predicts that the CVE 140-2 does not affect the device profile 150-1 which does not include Windows 7. In this example, since the CVE 140-2 affects device profiles 150 with Windows 7 OS feature 136-1a and Python 2.7 installed software features 152-5a, the classifier 122 determines that the CVE 140-2 does not affect the device profile 150-1 which does not include Windows 7 OS feature 152. Thus, in this example, the classifier 122 does not associate the CVE 140-2 with the device profile 150-1.

In a third example, assume that device profile 150-2 includes features 152, such as, Windows 7 SP1 OS feature 152-1b, X86 CPU architecture feature 152-2b, CUDA GPU architecture feature 152-3b, DDR3 memory architecture feature 152-4b, and Python 2.7 feature 152-5b. The classifier 122 identifies that the device profile 134-2 (illustrated in TABLE. 4) has features 136-1b and 136-5b in common with the device profile 150-2. The classifier 122 sums up the feature importance values 138-1b and 138-5b associated with the common features 136-1b and 136-5b and determines that their total feature importance values 138 is 100% which is above the feature importance threshold value 146 (i.e., 80%). Thus, the classifier 122 predicts that the device profile 150-2 may also be affected by the CVE 140-2 (which is associated with the device profile 134-2). As such, the classifier 122 associates the device profile 150-2 with the CVE 140-2, e.g., by adding the CVE 140-2 column to the device profile 150-2, as illustrated in TABLE. 7.

TABLE 7

Example of the device profile 150-2.

| Device profile 150 | Features 152 | | Predicted CVE 140 |
|---|---|---|---|
| Device profile 150-2 | OS Feature 152-1b | Windows 7 SP1 | CVE 140-2 |
| | CPU architecture Feature 152-2b | X86 | |
| | GPU architecture Feature 152-3b | CUDA | |
| | Memory architecture Feature 152-4b | DDR3 | |
| | Installed software Feature 152-5b | Python 2.7 | |

As such, the classifier 122 may associate any device profile 150 which includes the Windows 7 OS feature 152 and the Python 2.7 feature 152 with the CVE 140-2.

In step 318, the classifier 122 identifies the particular security patch 144 associated with the selected device profile 134. In one embodiment, the classifier 122 may identify the particular security patch 144 based on its corresponding unique security patch ID, such as, Security Patch ID 2020-4312, etc. The classifier 122 may identify the particular security patch 144 based on the training dataset 142, in which the particular security patch 144 is associated with the particular CVE 140.

In step 320, the classifier 122 associates the particular security patch 144 with the particular device profile 150. In this process, the classifier 122, for example, may add the particular security patch 144 in a new column or a new section of the particular device profile 150-1.

Continuing the first example in step 310, the classifier 122 associates the security patch 144-1 with the device profile 150-1 to address the security vulnerabilities identified in the CVE 140-1, as illustrated in TABLE. 8.

TABLE 8

Example of the device profile 150-1 with the CVE 140-1 and security patch 144-1.

| Device profile 150 | Features 152 | | Predicted CVE 140 | Recommended security patch 144 |
|---|---|---|---|---|
| Device profile 150-1 | OS Feature 152-1a | Windows 8 | CVE 140-1 | Security patch 144-1 |
| | CPU architecture Feature 152-2a | X86 | | |

TABLE 8-continued

Example of the device profile 150-1 with the CVE 140-1 and security patch 144-1.

| Device profile 150 | Features 152 | | Predicted CVE 140 | Recommended security patch 144 |
|---|---|---|---|---|
| | GPU architecture Feature 152-3a | OpenCL | | |
| | Memory architecture Feature 152-4a | DDR4 | | |
| | Installed software Feature 152-5a | Python 2.7 | | |

In step 322, the classifier 122 flags the particular device profile 150-1 to be updated with the particular security patch 144 to address the security vulnerabilities identified in the particular CVE 140 associated with the particular device profile 150.

In step 324, the classifier 122 determines whether to select another device profile 134. Here, the classifier 122 determines whether all of the device profiles 134 which have one or more features 136 in common with the particular device profile 150 have been evaluated. The classifier 122 determines to select another device profile 134 when at least one device profile 134 from among the plurality of the device profiles 134 (which has one or more features 136 in common with the particular device profile 150) has not yet been evaluated. If the classifier 122 determines that at least one device profile 134 has no been evaluated, the method 300 returns to the step 308 where the classifier 122 selects another device profile 134 (which has one or more features 136 in common with the particular device profile 150). Otherwise, the method 300 reaches the end of the classification process and determining CVEs 140 for the particular device profile 150.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for associating common vulnerability and exposures (CVEs) with device profiles, comprising:
a memory that stores a plurality of CVEs and a plurality of device profiles, each device profile from among the plurality of device profiles is associated with a corresponding CVE from among the plurality of CVEs, wherein each device profile from among the plurality of device profiles comprises features of a corresponding device, and the features comprise at least an operating system, a CPU architecture, a GPU architecture, a memory architecture, and an installed software of the corresponding device; and
a processor operably coupled to the memory, configured to:
for a first device profile from among the plurality of device profiles stored in the memory, determine a set of feature importance values for features of the first device profile, wherein a feature importance value of a corresponding feature of the first device profile associated with a CVE indicates a probability of the CVE to affect the first device profile with respect to that feature, wherein the set of feature importance values comprises:
a first feature importance value of the operating system that indicates a first probability of the CVE affecting the first device profile with respect to the operating system;
a second feature importance value of the CPU architecture that indicates a second probability of the CVE affecting the first device profile with respect to the CPU architecture;
a third feature importance value of the GPU architecture that indicates a third probability of the CVE affecting the first device profile with respect to the GPU architecture;
a fourth feature importance value of the memory architecture that indicates a fourth probability of the CVE affecting the first device profile with respect to the memory architecture; and
a fifth feature importance value of the installed software that indicates a fifth probability of the CVE affecting the first device profile with respect to the installed software;
identify that the first device profile that has one or more features in common with a second device profile, wherein:
identifying the first device profile has the one or more features in common with the particular second device profile comprises:
extracting, by implementing a natural language processing neural network, incidents describing devices being infected by the plurality of CVEs from documentation associated with the plurality of CVEs, wherein the incidents are reported by multiple users;

determining a first frequency and a first severity of a first CVE from among of the plurality of CVEs infecting the devices with respect to each of the features from the extracted incidents, wherein the first frequency of the first CVE infecting the devices with respect to each of the features indicates a number of times the first CVE infected a number of the devices with respect to each of the features, wherein if as a consequence of the first CVE, a third party is able to gain unauthorized access to the devices and erase data from memories of the devices, the first severity of the first CVE is determined to be more than a threshold severity;

determining a second frequency and a second severity of a second CVE from among of the plurality of CVEs infecting the devices with respect to each of the features from the extracted incidents, wherein the second frequency of the second CVE infecting the devices with respect to each of the features indicates a number of times the second CVE infected a number of the devices with respect to each of the features, wherein if as a consequence of the second CVE, a third party is able to gain unauthorized access to the devices and erase data from memories of the devices, the severity of the second CVE is determined to be more than a threshold severity; and determining, based at least on the determined frequency and severity of each of the plurality of the CVEs infecting the devices, a total feature importance value associated with the one or more features that are in common between the first device profile and the second device profile, wherein the total feature importance value is a first sum of the set of feature importance values of the one or more features of the first device profile that are in common with the second device profile, wherein the first sum of the set of feature importance values corresponds to the first sum of the first probability, the second probability, the third probability, the fourth probability, and the fifth probability; and identifying, by a classifier machine learning algorithm, the first device profile is labeled with the first CVE and the second CVE based on a training dataset, wherein the training dataset comprises the plurality of device profiles, each of the plurality of device profiles is labeled with the corresponding CVE and corresponding security patches; the first device profile is associated with a first device; and the second device profile is associated with a second device;

duplicate the second device profile for the first CVE and the second CVE, such that a first duplicate of the second device profile is associated with the first CVE and the second duplicate of the second device profile is associated with the second CVE, wherein the second device profile is not among the plurality of device profiles;

determine that the total feature importance value is more than a feature importance threshold value;

in response to determining that the total feature importance value is more than the feature importance threshold value:

identify a particular CVE associated with the first device profile;

associate the particular CVE with the second device profile;

identify a particular security patch associated with the first device profile;

associate the particular security patch to the second device profile; and update the second device associated with the second device profile with the identified security patch.

2. The system of claim 1, wherein identifying that the first device profile from among the plurality of device profiles that has the one or more features in common with the second device profile comprises:

identifying a first feature of the second device profile;

determining whether the first device profile comprises the first feature;

in response to determining that the first device profile comprises the first feature, determining that the first device profile has the first feature in common with the second device profile;

identifying a second feature of the second device profile;

determining whether the first device profile comprises the second feature; and in response to determining that the first device profile comprises the second feature, determining that the first device profile has the second feature in common with the second device profile.

3. The system of claim 1, wherein identifying that the first device profile has the one or more features in common with the second device profile comprises:

identifying a first feature of the first device profile;

identifying a first feature importance value of the first feature;

identifying a second feature of the first device profile;

identifying a second feature importance value of the second feature;

determining whether the second device profile includes the first feature;

in response to determining that the second device profile includes the first feature, determining whether the first feature importance value is more than the feature importance threshold value;

in response to determining that the first feature importance value is more than the feature importance threshold value, determining that the first device profile has the first feature in common with the second device profile;

in response to determining that the first feature importance value is less than the feature importance threshold value, determining whether the second device profile includes the second feature;

in response to determining that the second device profile includes the second feature, determining whether a second sum of the first feature importance value and the second feature importance value is more than the feature importance threshold value; and in response to determining that the second sum of the first feature importance value and the second feature importance value is more than the feature importance threshold value, determining that the first device profile has at least the second feature in common with the second device profile.

4. The system of claim 1, wherein associating the particular CVE with the second device profile is in response to:

confirming that the particular CVE comprises security vulnerabilities that affect the second device profile.

5. The system of claim 1, wherein the processor is further configured to:
- identify that the first device profile is associated with a third CVE;
- in response to identifying that the first device profile is associated with the third CVE, associate the third CVE to the second device profile.

6. The system of claim 1, wherein the feature importance threshold value is configurable by a user.

7. The system of claim 1, wherein the second device comprises a computing device, a server, a desktop computer, or a laptop.

8. A method for associating common vulnerability and exposures (CVEs) with device profiles, comprising:
- for a first device profile from among a plurality of device profiles stored in a memory, determining a set of feature importance values for features of the first device profile from among the plurality of device profiles, wherein a feature importance value of a corresponding feature of the first device profile from among the plurality of device profiles associated with a CVE indicates a probability of the CVE to affect the first device profile from among the plurality of device profiles with respect to that feature, wherein the set of feature importance values comprises:
  - a first feature importance value of an operating system that indicates a first probability of the CVE affecting the first device profile with respect to the operating system;
  - a second feature importance value of a CPU architecture that indicates a second probability of the CVE affecting the first device profile with respect to the CPU architecture;
  - a third feature importance value of a GPU architecture that indicates a third probability of the CVE affecting the first device profile with respect to the GPU architecture;
  - a fourth feature importance value of a memory architecture that indicates a fourth probability of the CVE affecting the first device profile with respect to the memory architecture; and
  - a fifth feature importance value of an installed software that indicates a fifth probability of the CVE affecting the first device profile with respect to the installed software;
- identifying that the first device profile that has one or more features in common with a second device profile, wherein:
  - identifying the first device profile has the one or more features in common with the second device profile comprises:
    - extracting, by implementing a natural language processing neural network, incidents describing devices being infected by the plurality of CVEs from documentation associated with the plurality of CVEs, wherein the incidents are reported by multiple users;
    - determining a first frequency and a first severity of a first CVE from among of the plurality of CVEs infecting the devices with respect to each of the features from the extracted incidents, wherein the first frequency of the first CVE infecting the devices with respect to each of the features indicates a number of times the first CVE infected a number of the devices with respect to each of the features, wherein if as a consequence of the first CVE, a third party is able to gain unauthorized access to the devices and erase data from memories of the devices, the first severity of the first CVE is determined to be more than a threshold;
    - determining a second frequency and a second severity of a second CVE from among of the plurality of CVEs infecting the devices with respect to each of the features from the extracted incidents, wherein the second frequency of the second CVE infecting the devices with respect to each of the features indicates a number of times the second CVE infected a number of the devices with respect to each of the features, wherein if as a consequence of the second CVE, a third party is able to gain unauthorized access to the devices and erase data from memories of the devices, the severity of the second CVE is determined to be more than a threshold; and
    - determining, based at least on the determined frequency and severity of each of the plurality of the CVEs infecting the devices, a total feature importance value associated with the one or more features that are in common between the first device profile and the second device profile, wherein the total feature importance value is a first sum of the set of feature importance values of the one or more features of the first device profile that are in common with the second device profile, wherein the first sum of the set of feature importance values corresponds to the first sum of the first probability, the second probability, the third probability, the fourth probability, and the fifth probability; and
    - identifying, by a classifier machine learning algorithm, the first device profile is labeled with the first CVE and the second CVE based on a training dataset, wherein the training dataset comprises the plurality of device profiles, each of the plurality of device profiles is labeled with the corresponding CVE and corresponding security patches;
  - the first device profile is associated with a first device; and
  - the second device profile is associated with a second device;
- duplicate the second device profile for the first CVE and the second CVE, such that a first duplicate of the second device profile is associated with the first CVE and the second duplicate of the second device profile is associated with the second CVE, wherein the second device profile is not among the plurality of device profiles;
- determine that the total feature importance value is more than a second threshold;
- in response to determining that the total feature importance value is more than the second threshold:
  - identifying a particular CVE associated with the first device profile;
  - associating the particular CVE with the second device profile;
  - identify a particular security patch associated with the first device profile;
  - associate the particular security patch to the second device profile; and
  - update the second device associated with the second device profile with the identified security patch.

9. The method of claim 8, wherein identifying that the first device profile from among the plurality of device profiles that has the one or more features in common with the second device profile comprises:
- identifying a first feature of the second device profile;
- determining whether the first device profile comprises the first feature;
- in response to determining that the first device profile comprises the first feature, determining that the first device profile has the first feature in common with the second device profile;
- identifying a second feature of the second device profile;
- determining whether the first device profile comprises the second feature; and
- in response to determining that the first device profile comprises the second feature, determining that the first device profile has the second feature in common with the second device profile.

10. The method of claim 8, wherein identifying that the first device profile that the one or more features in common with the second device profile further comprises:
- identifying a first feature of the first device profile;
- identifying a first feature importance value of the first feature;
- identifying a second feature of the first device profile;
- identifying a second feature importance value of the second feature;
- determining whether the second device profile includes the first feature;
- in response to determining that the second device profile includes the first feature, determining whether the first feature importance value is more than the feature importance threshold value;
- in response to determining that the first feature importance value is more than the feature importance threshold value, determining that the first device profile has the first feature in common with the second device profile;
- in response to determining that the first feature importance value is less than the feature importance threshold value, determining whether the second device profile includes the second feature;
- in response to determining that the second device profile includes the second feature, determining whether a second sum of the first feature importance value and the second feature importance value is more than the feature importance threshold value; and
- in response to determining that the second sum of the first feature importance value and the second feature importance value is more than the feature importance threshold value, determining that the first device profile has at least the second feature in common with the second device profile.

11. The method of claim 8, associating the particular CVE with the second device profile is in response to:
- confirming that the particular CVE comprises security vulnerabilities that affect the second device profile.

12. The method of claim 8, further comprising:
- identifying that the first device profile is associated with a third CVE;
- in response to identifying that the first device profile is associated with the third CVE, associate the second CVE to the second device profile.

13. The method of claim 8, wherein the second device comprises a computing device, a server, a desktop computer, or a laptop.

14. A non-transitory computer-readable medium storing instructions that when executed by a processor cause the processor to:
- for a first device profile from among a plurality of device profiles stored in a memory, determine a set of feature importance values for features of the first device profile from among the plurality of device profiles, wherein a feature importance value of a corresponding feature of the first device profile from among the plurality of device profiles associated with a CVE indicates a probability of the CVE to affect the first device profile with respect to that feature, wherein the set of feature importance values comprises:
  - a first feature importance value of an operating system that indicates a first probability of the CVE affecting the first device profile with respect to the operating system;
  - a second feature importance value of a CPU architecture that indicates a second probability of the CVE affecting the first device profile with respect to the CPU architecture;
  - a third feature importance value of a GPU architecture that indicates a third probability of the CVE affecting the first device profile with respect to the GPU architecture;
  - a fourth feature importance value of a memory architecture that indicates a fourth probability of the CVE affecting the first device profile with respect to the memory architecture; and
  - a fifth feature importance value of an installed software that indicates a fifth probability of the CVE affecting the first device profile with respect to the installed software;
- identify that the first device profile that has one or more features in common with a second device profile, wherein:
  - identifying the first device profile has the one or more features in common with the second device profile comprises:
    - extracting, by implementing a natural language processing neural network, incidents describing devices being infected by a plurality of CVEs from documentation associated with the plurality of CVEs, wherein the incidents are reported by multiple users;
    - determining a first frequency and a first severity of a first CVE from among of the plurality of CVEs infecting the devices with respect to each of the features from the extracted incidents, wherein the first frequency of the first CVE infecting the devices with respect to each of the features indicates a number of times the first CVE infected a number of the devices with respect to each of the features, wherein if as a consequence of the first CVE, a third party is able to gain unauthorized access to the devices and erase data from memories of the devices, the first severity of the first CVE is determined to be more than a threshold; and
    - determining a second frequency and a second severity of a second CVE from among of the plurality of CVEs infecting the devices with respect to each of the features from the extracted incidents, wherein the second frequency of the second CVE infecting the devices with respect to each of the features indicates a number of times the second CVE infected a number of the devices with respect to each of the features, wherein if as a consequence of the second CVE, a third party is able to gain unauthorized access to the devices and erase data from memories of the devices, the severity of the second CVE is determined to be more than a threshold;

determining, based at least on the determined frequency and severity of each of the plurality of the CVEs infecting the devices, a total feature importance value associated with the one or more features that are in common between the first device profile and the second device profile, wherein the total feature importance value is a first sum of the set of feature importance values of the one or more features of the first device profile that are in common with the second device profile, wherein the first sum of the set of feature importance values corresponds to the first sum of the first probability, the second probability, the third probability, the fourth probability, and the fifth probability; and identifying, by a classifier machine learning algorithm, the first device profile is labeled with the first CVE and the second CVE based on a training dataset, wherein the training dataset comprises the plurality of device profiles, each of the plurality of device profiles is labeled with the corresponding CVE and corresponding security patches;

the first device profile is associated with a first device; and the second device profile is associated with a second device;

duplicate the second device profile for the first CVE and the second CVE, such that a first duplicate of the second device profile is associated with the first CVE and the second duplicate of the second device profile is associated with the second CVE, wherein the second device profile is not among the plurality of device profiles;

determine that the total feature importance value is more than a second threshold;

in response to determining that the total feature importance value is more than the second threshold:
  identify a particular CVE associated with the first device profile;
  associate the particular CVE with the second device profile;
  identify a particular security patch associated with the first device profile;
  associate the particular security patch to the second device profile; and
  update the second device associated with the second device profile with the identified security patch.

15. The non-transitory computer-readable medium of claim 14, wherein identifying that the first device profile from among the plurality of device profiles that has one or more features in common with the second device profile comprises:
  identifying a first feature of the second device profile;
  determining whether the first device profile comprises the first feature;
  in response to determining that the first device profile comprises the first feature, determining that the first device profile has the first feature in common with the second device profile;
  identifying a second feature of the second device profile;
  determining whether the first device profile comprises the second feature; and
  in response to determining that the first device profile comprises the second feature, determining that the first device profile has the second feature in common with the second device profile.

16. The non-transitory computer-readable medium of claim 14, wherein identifying that the first device profile has the one or more features in common with the second device profile comprises:
  identifying a first feature of the first device profile;
  identifying a first feature importance value of the first first feature;
  identifying a second feature of the first device profile;
  identifying a second feature importance value of the second feature;
  determining whether the second device profile includes the first feature;
  in response to determining that the second device profile includes the first feature, determining whether the first feature importance value is more than the feature importance threshold value;
  in response to determining that the first feature importance value is more than the feature importance threshold value, determining that the first device profile has the first feature in common with the second device profile;
  in response to determining that the first feature importance value is less than the feature importance threshold value, determining whether the second device profile includes the second feature;
  in response to determining that the second device profile includes the second feature, determining whether a second sum of the first feature importance value and the second feature importance value is more than the feature importance threshold value; and
  in response to determining that the second sum of the first feature importance value and the second feature importance value is more than the feature importance threshold value, determining that the device profile has at least the second feature in common with the second device profile.

17. The non-transitory computer-readable medium of claim 14, wherein the instruction when executed by the processor further cause the processor to:
  identify that the first device profile is associated with a third CVE;
  in response to identifying that the first device profile is associated with the third CVE, associate the third CVE to the second device profile.

* * * * *